INVENTOR
Alden I. McFarlan

May 12, 1959
A. I. McFARLAN
2,885,867
AIR CONDITIONING SYSTEM AND CONTROL
Filed April 2, 1956
3 Sheets-Sheet 2
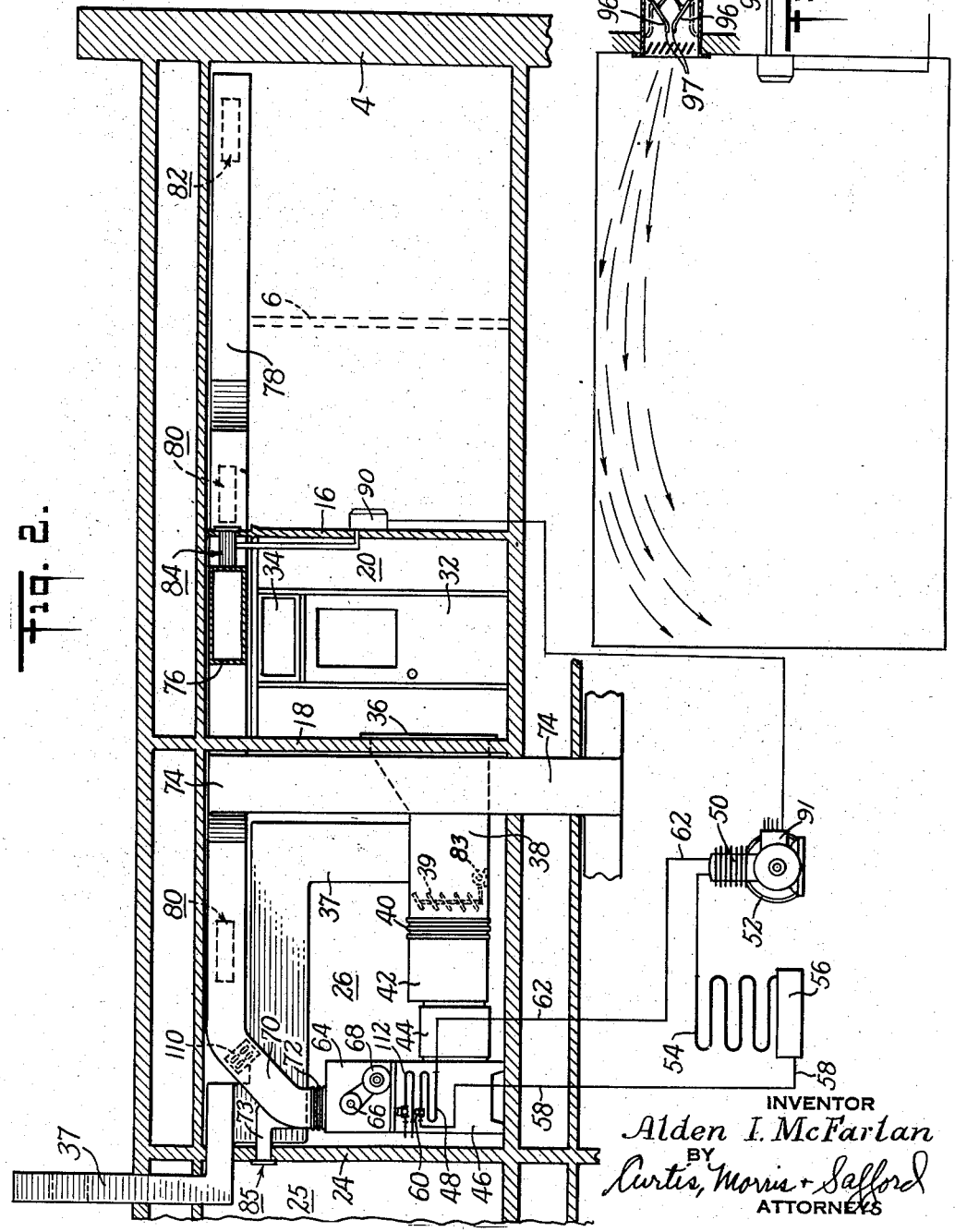
INVENTOR
Alden I. McFarlan
BY
Curtis, Morris + Safford
ATTORNEYS

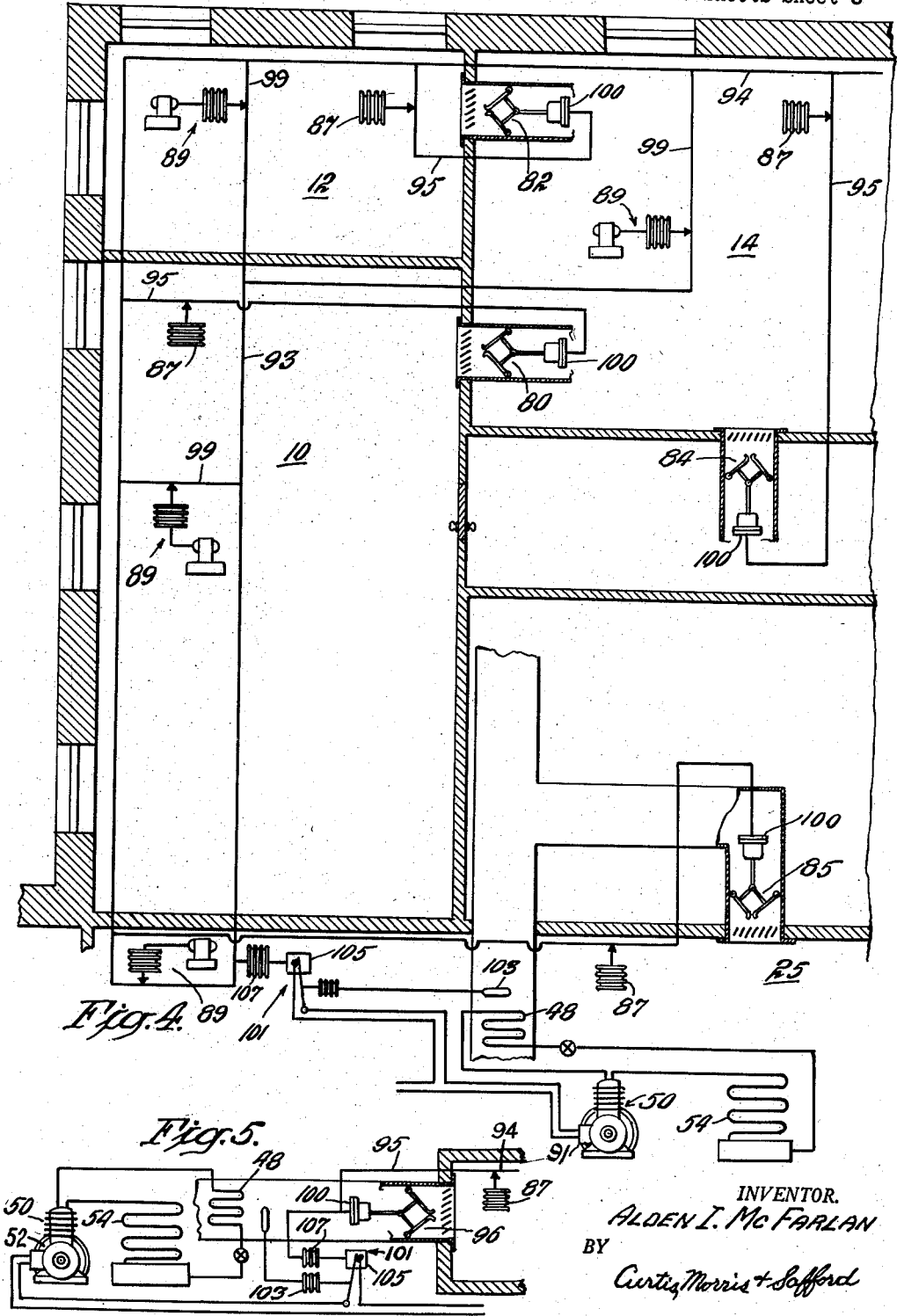

United States Patent Office 2,885,867
Patented May 12, 1959

2,885,867
AIR CONDITIONING SYSTEM AND CONTROL
Alden I. McFarlan, Westfield, N.J.

Application April 2, 1956, Serial No. 575,494

11 Claims. (Cl. 62—176)

This invention relates to air conditioning, and more in particular to the accurate and simultaneous control of the temperature and the relative humidity of the air in a conditioned space, and with automatic regulation so as to maintain comfort conditions.

This application is a continuation-in-part of my copending applications, Serial No. 226,849, filed may 17, 1951, entitled Air Conditioning System and Control, now abandoned, and relates back to said prior applications for all common subject matter.

It is an object of the present invention to provide an improved system for controlling simultaneously the air temperature and humidity in a conditioned space. It is a further object to provide for accurate control of temperature and humidity in each of several zones from a single central air conditioning unit. It is a further object to provide for the above with apparatus which is inexpensive to install and maintain, and simple and dependable in operation, and is adaptable to varying conditions such as are encountered in commercial installations.

Air conditioning systems have been provided for various types of enclosures including theatres, restaurants and the like, apartment buildings and private homes, and also for factories, laboratories and office buildings. Particularly with systems such as are installed in factories, laboratories and office buildings, it is desirable to provide for "zoning"; that is, the various portions or zones of the air conditioned space normally require different and varying amounts of cooling and dehumidifying and it is desirable to provide a system where each zone may be cooled and dehumidified as is necessary. For example, in an office building the sun may strike upon the east side of the building in the morning so that all of the rooms on that side require considerable cooling, while the rooms on the west side of the building may require little or no cooling; later in the day then when the sun strikes on the west side of the building, the conditions may be reversed so that the rooms on the east require little or no cooling, whereas the rooms on the west require considerable cooling. The amount of cooling required in a zone, such as a room, may also vary during the day due to changes in the work being done in or changes in the number of occupants of the zone; thus, in a laboratory the cooling load may increase or decrease very greatly.

Prior air conditioning systems with simple controls have often been unsatisfactory because they tended to produce excessive cooling in some areas or zones of the air conditioned space and too little cooling in other areas, and at times there may be proper cooling but the humidity may be too high for comfort. Some such systems have had involved automatic controls to regulate the relative cooling effects in the various areas, but these too have caused difficulties particularly under extreme conditions such as under very light and very heavy loads. For example, if thermostatic controls are provided which start and stop the compressor in accordance with demand, a system which is entirely satisfactory on a high temperature day will be stopped for long periods of time on a relatively low temperature day. During such shutdowns there is apt to be a rise in the relative humidity in the air conditioned space so that a very uncomfortable "clammy" condition is created; and, there may be such sudden cooling as to produce very objectionable "chilling" when the cooling starts again. It is an object of the present invention to provide a simplified and thoroughly practical air conditioning system which will carry heavy loads with optimum temperature and humidity conditions and which will also operate at reduced loads and even under light loads to give equally satisfactory results.

In the drawings:

Figure 2 is a diagram on the line 2—2 of Figure 1;

Figure 3 is a simplified and somewhat schematic showing of one of the air distributors of Figures 1 and 2;

Figure 4 is a diagrammatic view of a control system operated in response to a thermostat and humidistat for regulating the humidity in an enclosure; and Figure 5 is a diagrammatic view of a modified control system operated by the thermostat for regulating the humidity in an enclosure.

Figure 1:
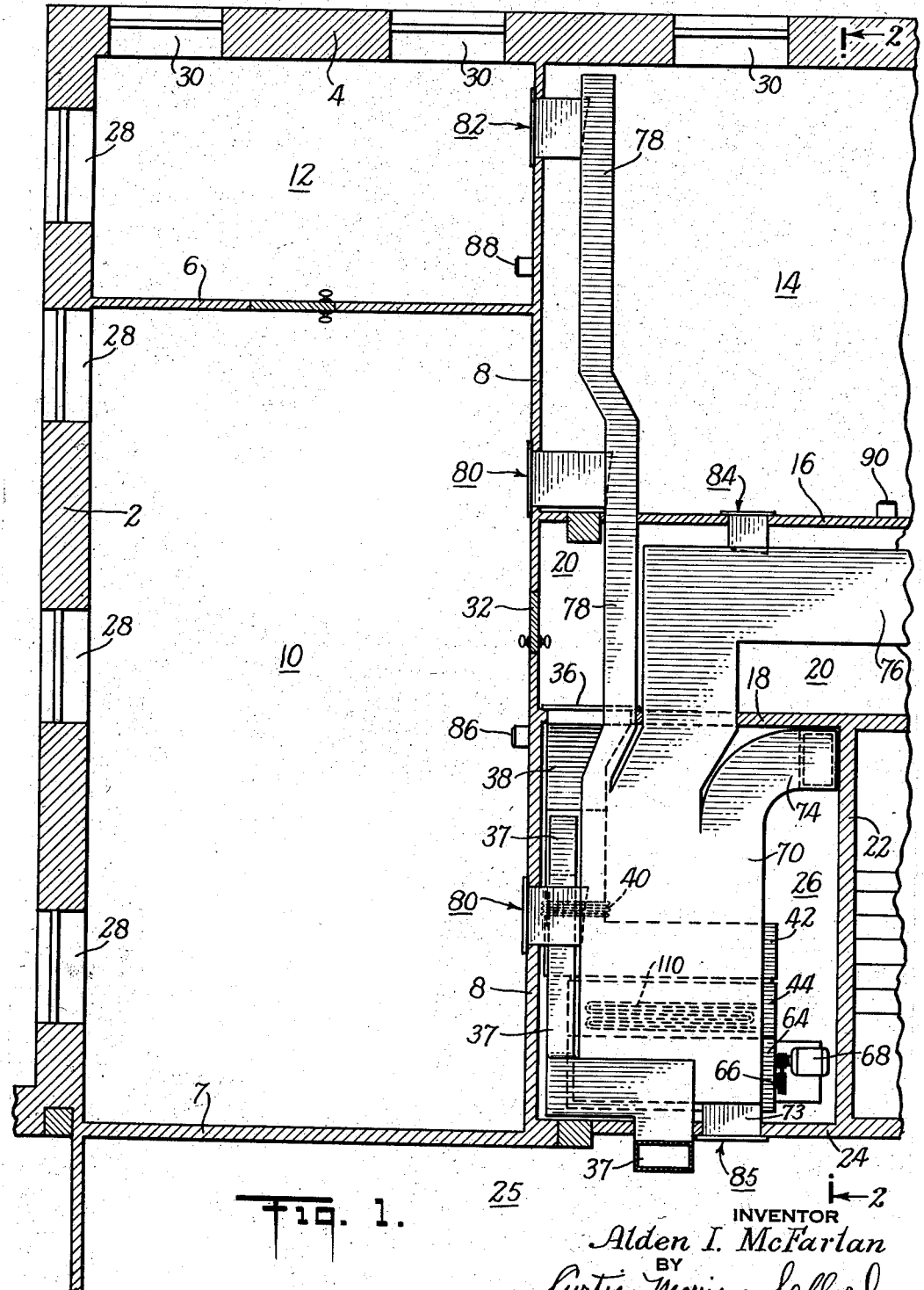
Figure 1 is a representation of one embodiment of the invention.

In accordance with the present invention the air conditioned space is divided into zones, and then the temperature and the humidity in each zone are simultaneously controlled. In practice, the air is distributed from a central conditioning station where it passes through a cooling and dehumidifying zone within which the temperature and humidity of the air are reduced; and, then the temperature and humidity of the air being distributed are controlled in such a manner as to regulate the humidity, and the amount of air being distributed is varied to maintain the desired temperature in each of the conditioned zones. Thus, in accordance with one important aspect of the invention, there is a humidistat control in each conditioned zone which is effective, when the humidity in the zone rises, to reduce the temperature and humidity of the air being distributed; and, there is a thermostat in each conditioned zone which maintains the desired temperature in the zone by regulating the quantity of the air being delivered to that zone. In accordance with another aspect of the invention, there is a thermostatic control which maintains the desired temperature in the zone by regulating the quantity of air being delivered to that zone and automatically reducing the temperature and humidity of the air being distributed as the quantity is reduced.

In this way the temperature within each zone is maintained within certain predetermined acceptable limits and the humidity within each zone is below a predetermined maximum value which is acceptable. With a multi-zone system the humidity in some zones may be somewhat below the predetermined maximum value, but generally this is not objectionable and where it is objectionable, steps are taken to overcome the difficulty. Thus, the practice of the present invention involves a radical departure from the prior systems where the tendency has been to treat the control of humidity as secondary to the control of the temperature with the result that the temperature was maintained within theoretically acceptable limits, but the humidity often rose to very objectionable values. With the present invention, the only departure from the optimum range of temperature and humidity is that wherein the humidity in a zone may be below the conventional range and, as has been indicated, this is generally unobjectionable.

Another aspect of the invention contemplates that each conditioned zone has one or more air outlets from each of which the flow of air is throttled in order to reduce the quantity of air delivered to that zone. The arrangement is such that a reduction in load and the resulting reduction in the quantity of air being delivered is not accompanied by a reduction in the velocity of the air from each outlet into the conditioned space. In this way the "throw" of each incoming stream of air remains substantially constant; that is, the throttling at the air discharge nozzle causes a stream of smaller cross-section to be projected along substantially the same trajectory as was traversed by the larger stream. Thus, within each zone the stream of conditioned air is properly distributed regardless of the quantity of air being delivered.

As suggested above, the air is reduced to a lower temperature at the central conditioning station whenever the humidity in any conditioned zone rises above an acceptable value. Under such circumstances, a reduction in the temperature of the air being distributed will cause each conditioned zone to require a lesser volume of the colder air because of the greater cooling effect of such air. Accordingly, when humidity conditions cause the air at the central conditioning station to be reduced to a lower temperature, the thermostat in each conditioned zone reacts to tend to reduce the volume of air passing to that zone, and thus maintain the desired temperature in that zone. Later when the air is being cooled to a temperature which is lower than that necessary to maintain comfort conditions in all of the conditioned zones, then the temperature of the air leaving the central conditioning station is raised. In other words, the controls regulate the temperature of the air at the central conditioning station, and also the volume of air passing to each zone, so as to maintain comfort conditions within each of the conditioned zones.

The invention also contemplates under some conditions of operation, the modification of the control functions of the system to compensate for specific circumstances or conditions, for example, to take into account the temperatures outside of the conditioned space. Then, for example, on a relatively cool day the thermostats within the various air conditioned zones tend to maintain ideally lower temperatures in the various zones. Similarly, a low outside temperature and the smaller volume of air tends to produce lower temperatures for the air being distributed, and this tends to increase the dehumidifying effect. This result may be produced by a compensating control responsive to a temperature or humidity condition in the zone for directly resetting the temperature at which the air leaves the cooling coil or for resetting the temperature of the cooling element, such as a direct expansion refrigerating coil or a chilled water coil. It is thus seen that on days of light load when humid and "clammy" conditions are most apt to exist, and when the prior air conditioning systems have proved very unsatisfactory, the present invention automatically produces a greater dehumidifying effect, and thus provides improved operating conditions.

Referring particularly to Figure 1 of the drawings, a horizontal view or plan of the southeast corner of a building is shown with the east wall 2 at the left and the south wall 4 at the top of the figure. Partitions 6, 7 and 8 form a large room 10 and a smaller corner room 12. At the right of room 12 there is shown the end of a room 14 having a side partition 16. An additional partition 18 extends parallel to partition 16 and forms a hall 20; and extending from partition 18 is a partition 22 which forms with partitions 18 and 8 and a partition 24 an air conditioning space 26. Partition 24 forms one wall on an inside room 25 which has no outside walls or windows and access to which is had through an extension (not shown) of hall 20.

The outside wall 2 has four windows 28 and the outside wall 4 has three windows 30. As shown best in Figure 2 there is a door 32 opening from hall 20 into room 10 and similar doors (not shown) open from room 10 to room 12 and from the hall to rooms 14 and 25. Over each door there is an air return transom 34 through which the air from the room may pass to the hall. As indicated above, room 26 is the space where the air conditioning equipment is located. Accordingly, there is a grill opening 36 from the hall 20 into room 26 and air passes through this grilled opening into an air inlet air duct 38. A controlled amount of fresh air is also drawn into duct 38 through a fresh air inlet duct 37 which extends to the roof of the building. At the left, duct 38 has an automatic damper 39, and the duct is connected through a flexible canvas collar 40 to a duct 42 through which the air passes to a filter 44.

The air passes through this filter and then into an air conditioning chamber 46 which forms the air cooling and dehumidifying zone and within which the air passes upwardly through air cooling coils 48. Illustratively, cooling coils 48 comprise an evaporator which is part of a refrigeration system which is represented schematically and has a compressor 50 driven by an electric motor 52, a condenser 54 and a receiver 56. The liquid refrigerant passes to the evaporator through a line 58 which has an expansion valve 60 therein, and the gas refrigerant returns to the compressor through a line 62. The operation of the compressor and its motor is controlled in a manner discussed below to maintain the desired evaporator temperature. As indicated above, evaporator 48 forms a cooling zone within which the air is cooled and dehumidified, and it is drawn upwardly through this zone and thence through a casing 64 by a fan 66 driven by a motor 68.

This fan provides the sole air circulating means for the entire system. Thus, the air is blown upwardly from casing 64 through a header duct 70 which is connected to the casing by a flexible canvas collar 72. As shown best in Figure 1, header duct 70 is connected to four distribution ducts 73, 74, 76 and 78 through which the conditioned air flows to the various air conditioned zones. Duct 74 extends downwardly to the floor below that shown in the drawing, while ducts 76 and 78 distribute air to the various outside rooms on the same floor, and duct 73 extends directly to the inside room 25. Duct 78 extends through the hall and along the top of partition 8 and air flows from this duct into rooms 10 and 12. Duct 76 extends into the hall and then turns to the right along partition 16 and air flows from this duct to room 14 and to the remainder of the outside rooms on that floor of the building. Extending from duct 78 are two air outlet units 80 through which air is discharged from this duct into room 10, and a similar air outlet unit 82 is connected adjacent the end of duct 78 through which air is discharged into room 12. A similar air outlet unit 84 extends from duct 76 through partition 16 to discharge air into room 14, and a similar air outlet unit 85 extends from duct 73 to room 25.

It has been pointed out that a controlled amount of fresh air is drawn into duct 38 through a duct 37, and that air is returned from the air conditioned zones to duct 38 through hall 20 which acts as an air return passageway. Thus, after being blown into one of the rooms 10, 12 or 14, for example, the air returns through the transoms 34 into the hall and thence through the grill opening 36 into duct 38 where it joins the stream of incoming fresh air. The volume of air thus circulated by fan 66 is controlled by the automatic damper 39 which is opened and closed by a motor 83 which may be operated in response to pressure variations at the outlet from fan 66 so as to maintain the desired air pressure in the header duct 70. Dampers (not shown) in duct 37 regulate the amount of incoming fresh air.

Figure 3 shows the manner in which the air passes into each of the rooms, illustratively, from each of the air outlet units into room 10. The air pressure is maintained at a controlled value within the air distribution ducts, and the air is directed from each outlet unit through a grill horizontally and somewhat upwardly into its room at a controlled velocity regardless of the size of the air discharge opening. Accordingly, the stream of air tends to traverse the same general trajectory whether a large volume or a small volume of air is being delivered to the room.

In order to obtain this constant velocity effect the air discharge opening is reduced in cross-section whenever the quantity of air being passed into the room is to be reduced. Accordingly, each of the air discharge units has a pair of mating vanes 96, each of which has a lip 97 at one edge and is hinged at its other edge by a pivot 98 so as to swing between the fully-open position shown in broken lines and a fully-closed position wherein the lips 97 meet. These vanes are moved by a motor 100 which is connected to the vanes through a rod 102 and a pair of pivoted arms 104. The motor 100 also acts to hold the vanes in their adjusted position. The motor includes a control mechanism operable in response to the temperature in the room, so that the motor moves the vane lips away from each other to increase the discharge opening whenever the room temperature rises; and moves the vane lips toward each other to reduce the air outlet opening whenever the temperature falls below a predetermined value.

Within room 10 and centrally mounted on partition 8 is a control unit 86 which comprises a thermostat for controlling the volume of air and a humidistat for controlling the temperature of the air (see Fig. 1). Rooms 12 and 14 are provided with similar control units 88 and 90, each of which comprises a thermostat and a humidistat. Each of the control units 86, 88 and 90 is responsive to the temperature and humidity of the air in its room; and, as indicated, each thermostat controls the amount of air discharged into its room. A controller 91 (see Fig. 2) on the base of the compressor starts the compressor in response to a demand for cooling or dehumidifying in any of the conditioned zones, and keeps the compressor operating until all thermostats and humidistats are satisfied. Each of the humidistats is connected through an air line 93 to controller 91; this controller acts to lower the suction pressure and therefore the temperature of the air leaving the coils whenever the humidity in any room rises. For some systems, such as those using water or the like, as the circulating cooling medium, the temperature of the coils is regulated to produce the required temperature of the air leaving the coils, and this air temperature is in turn regulated to give the effects discussed.

Such a control arrangement is illustrated diagrammatically in Fig. 4. In this arrangement, each control unit 86, 88, 90, etc., indicated generally in Fig. 1, comprises a thermostat 87 and a humidistat 89 in each of the rooms 10, 12, 14 and 25. For purposes of illustration, the humidistats 89 are shown diagrammatically but it will be understood that any known form of humidistat may be used. The thermostats 87 and humidistats 89 operate on an air control system to vary the flow of air from a source at constant pressure to the elements to be operated. Air is supplied from a source at constant pressure through a line 94 with a separate branch 95 leading to each motor 100 of each air outlet 80, 82, 84 and 85. The thermostat 87 of the control unit 86, 88 or 90 for the particular room 10, 12 or 14, etc. varies the flow of air from supply line 94 through its branch 95 to vary the pressure of the air supplied to its motor 100 in accordance with the temperature in its room. Thus, motor 100 adjusts the vanes 96 of its air control unit 80, 82, 84 or 85 in accordance with the temperature in the room to regulate the amount of air supplied thereto. When the temperature in the room is at or below the thermostat setting, the motor 100 closes vanes 96; when the temperature in the room is at a predetermined value above the thermostat setting, the motor opens the vanes to their fully open position; and at any intermediate temperature in the room, the motor moves the vanes to corresponding intermediate positions to modulate the quantity of air supplied to the room in direct proportion to the temperature in the room.

The control also includes branches 99 from the air supply line 94 to each room 10, 12, 14 and 25 and the flow through each branch is controlled by the humidistat 89 of the control unit 86, 88, 90, etc. for the particular room. Each humidistat 89 operates to vary the air flow through its branch 99 in accordance with the humidity in its particular room 10, 12, 14 or 25 and close the branch when the humidity is below the predetermined value. All of the branches 99 beyond the humidistats 89 are connected to the air line 93 for adjusting the compressor controller 91 to regulate the temperature of the air leaving the coil 48.

The cooling coil 48 may comprise a chilled water coil or the evaporator of a refrigeration system of any desired type. Preferably, the coil 48 is so dimensioned in the direction of air flow as to insure cooling of the air below its dew point. Thus, air leaving the coil 48 will be saturated with moisture and have the same wet and dry bulb temperatures which at any particular dry bulb temperature will constitute a measurement of moisture content. Therefore, the moisture content of the air leaving coil 48 may be varied by varying its dry bulb temperature.

The controller 91 at the base of the compressor 50 may control the suction pressure of the compressor by any suitable and conventional way as by starting and stopping the compressor or by by-passing the pistons in certain cylinders. In the control illustrated in Fig. 4, the control 91 controls the starting and stopping of the compressor and, in turn, is controlled by a compensating thermostat 101 which resets the temperature at which the compressor is stopped. The compensating thermostat 101 comprises an element 103 responsive to a predetermined temperature of the air leaving the coil 48 for actuating a switch 105 controlling controller 91 and the compressor motor 52. A second element 107 responsive to air pressure in line 93, resulting from a humidistat 89 opening its branch 99 when the humidity in any room 10, 12, 14 or 15 is high, resets the temperature at which the element 103 operates switch 105 to stop the compressor 50 to a lower value. Such a compensating thermostat 101 is known, per se, and is therefore illustrated diagrammatically in Fig. 4 as comprising one temperature responsive element 103 for actuating one contact of the control switch 105 and another element 107 for adjusting the position of the other switch contact relative to the first switch contact. Thus, with the control arrangement illustrated in Fig. 4, the temperature responsive element 103 moves its contact to open position at one temperature of air leaving coil 48 when the humidity is low, but at a lower air leaving temperature when the humidity is high. In Fig. 4, the controller 91 for the compressor is shown as well as the switch 105 of the compensating thermostat 101 but it will be understood that in most applications the switch 105 would replace or constitute the controller 91.

It has been indicated above that the temperature of the air leaving coil 48 is controlled so as to maintain the desired relative humidity. The arrangement is such that whenever the vapor load causes the humidity in any room to rise above an acceptable value the humidistat 89 in that room reduces the temperature of the air cooling coils 48, and this causes much drier air to pass to the room. The thermostats 87 in all of the rooms will respond immediately to reduce the quantity of air, but the smaller volume of drier air will have a sufficient dehumidifying effect to bring the relative humidity down to the "comfort zone." The arrangement is also such that the temperature of the cooling coil 48, and the temperature of the conditioned air, is maintained at the highest acceptable value. Accordingly, when the vapor load in all of the rooms is such that the relative humidity in all of the rooms drops below a predetermined value the temperature of the air cooling coil 48 is raised. This, in turn, raises the temperature of the air passing from the coil, and less moisture is removed from this air. The thermostats 87 in the various rooms will then cause a larger volume of air to flow, and the temperature and humidity are thus maintained within the comfort zone.

The control illustrated in Fig. 4 shows a separate humidistat 89 in each room so that a high humidity in any room will produce dehumidification; but it will be understood that a humidistat may be provided in one room or zone only which normally has the highest relative humidity. Generally, such a single humidistat 89 would be located in a north zone having the least sun effect and which when satisfied with respect to humidity would result in satisfactory humidity conditions in the other rooms or zones.

Under some circumstances, it is not necessary to provide special controls to reduce the temperature of the cooling coils, because this characteristic can be designed into the system. For example, this temperature reduction effect is obtained by providing the compressor with a suction pressure regulator so that the suction pressure tends to drop for reduced loads, and the throttling of the quantity of air at each outlet under the control of a thermostat also tends to increase this effect. This drop in the evaporator temperature combined with the smaller quantity of air flowing over the colder evaporator causes the conditioned air to pass into the header duct at a reduced temperature and humidity. It should be noted, however, that unless the system is properly designed, such a simplified arrangement will not be satisfactory, especially if the system has zones which require different cooling and dehumidifying effects.

Such a control for regulating the humidity by a temperature control is illustrated in Fig. 5. The control comprises a thermostat 87 for each room for controlling the flow of air to motor 100 from a constant pressure source 94 for controlling the vanes 96 in its air outlets 80, 82, 84 or 85, the same as in the control illustrated in Fig. 4. Operation of compressor motor 50 also is controlled by a switch 105 operated by a compensating thermostat 101 having elements 103 and 107. The element 103 operates one switch contact responsive to the temperature of the air leaving coil 48 and the other element 107 adjusts the other switch contact to reset the temperature at which the switch stops compressor motor 52. With the control illustrated in Fig. 5, the element 107 is connected to the air line 95 parallel with operating motor 100 to adjust the contact of switch 105 to increase the temperature at which the switch opens when the room temperature is high and decrease the temperature at which the switch opens when the room temperature is low. Thus, with a low room temperature, the motor 100 operates vanes 96 toward a closed position and also adjusts the contact of switch 105 to maintain the compressor 50 in operation and reduce the temperature of the air leaving coil 48. A small quantity of very dry air is then delivered to the room to reduce the humidity in the room when the temperature in the room is low.

In the embodiment of the invention illustrated in Figs. 1 to 4, the vapor load in any zone is effective to reduce the temperature of the cooling coils. This causes an increase in the sensible cooling of the air but it causes a greater increase in the "moisture pick-up" or dehumidifying effect. For example, assume that room 10 is being maintained at a temperature of 80° F. and at 50% relative humidity, and that the system is being operated at full load and with the air passing from the cooling coils at 60° F. and 90% relative humidity. Then the air being withdrawn from the room contains 78 grains of moisture per pound and the air being passed to the room contains 70 grains of moisture per pound, so that moisture is being removed from this air at the rate of 8 grains per pound of air passing to the room. Assume then that the sensible load decreases and that the vapor load increases so that the humidistat reduces the temperature of the cooling coils with the result that the air passes to the ducts at 55° F. and 90% relative humidity, and such air contains 60 grains of moisture per pound. Thus, the air temperature is reduced twenty-five degrees instead of twenty degrees, which is a twenty-five percent increase in the sensible cooling effect of each pound of air; whereas 18 instead of 8 grains of moisture is removed from each pound of air, and this is an increase of one hundred twenty-five percent in the "moisture pick-up." It is thus seen that a very substantial dehumidifying effect may be obtained with a relatively small quantity of air which gives only a relatively small cooling effect.

Under some circumstances, the temperature of the cooling coils may be controlled in accordance with the outside temperature. Thus, on an extremely hot day when the major portion of the load is sensible cooling, the outside thermostat would cause the temperature of the cooling coils to be relatively high and, therefore, a large volume of air at a temperature of, for example, 65° F. would be passed to the ducts. On a relatively cool day when the sensible cooling is relatively low, the outside thermostat would reduce the temperature of the air leaving the cooling coils, which may be accomplished by reducing the temperature of the cooling coil, so that a small volume of much cooler air would be circulated. This control would cause the system to change automatically in its mode of operation so as to obtain somewhat the effects discussed above in the illustrative embodiment of the invention. However, it should be noted that the various factors are so involved that the above-mentioned effects will not be obtained except where the system and its controls are properly designed and regulated.

In the illustrative embodiment of the present invention, it has been indicated that the temperature of the evaporator is regulated by controller 91. However, the temperature of the evaporator may also be controlled by regulating the capacity of the compressor. Thus, for example, the compressor may be of such a character that it may be operated at full load, three-quarter load, half load or one-quarter load. It should be understood that the arrangement of the illustrative embodiment has particular advantages, although the present invention contemplates other manners of operation. For example, the cooling coils may be cooled by water or brine, or by another secondary heat exchange fluid. Under such circumstances, the temperature and rate of flow of the cooling fluid are regulated.

In the illustrative embodiment of the invention it has been indicated that the southeast corner of the building is shown in Figure 1 so that during hot weather the morning sun may produce a heavy sensible cooling load in rooms 10 and 12, whereas later in the day this load is light in room 10 but continues heavy in room 12 and it becomes heavy in room 14. Assuming that each room is occupied by a certain number of people with each person doing a certain type of work for the entire day, then the constant internal load on the air conditioning system comprises latent heat or vapor condensing load, and the sensible body heat and heat of the lights and electrical equipment. Thus, during the day, the external load caused by the sun varies considerably, so that the ratio between sensible heat load and the vapor condensing load will vary over a wide range. Similarly, from day to day when the outside temperature varies, a very high percentage of the total load on the air conditioning system is a sensible heat load on some days, whereas on other days the sensible heat load is very small. In accordance with the present invention, a high sensible heat load is handled by a large volume of cooled air while a load comprising mainly latent heat or vapor condensing load is handled by a relatively small volume of much cooler supply air, which supply air contains very little moisture and has the ability to pick up a much greater amount of moisture in the conditioned zones.

As indicated above, the inside room 25 receives air through a duct 73, and there is a thermostatically controlled outlet unit 85 which regulates the quantity of air which is delivered to this room. This room has no outside windows or walls and, therefore, it is completely surrounded by rooms which are at relatively constant temperatures, and there is no appreciable variation in the external sensible heat load. Furthermore, it is assumed that the room is mainly storage and machinery space, and, therefore, it has a relatively constant internal load and may require cooling while the outside zones require heating. Under these conditions of operation, it is desirable to provide room 25 with air below the desired room temperature, while the air to the outside zones of the building should be at a temperature above that desired in the zones. Therefore, a booster heater coil 110 is mounted in header duct 70 above the outlet to duct 73. The air passing into duct 70 is then at the proper temperature for delivery to room 25, and the remainder of the air is heated by the booster heater coil prior to passing into ducts 74, 76 and 78. This feature has particular advantage at such times that heating is necessary to satisfy the outside zones while cooling is simultaneously required for the inside zone. At such times, the system is still used as an air cooling system using the outside air as the cooling medium.

A steam coil 112 above the evaporator coil 48 provides for heating the entire stream of air. In the illustrative embodiment the air is delivered to the conditioned zones through wall outlets. It is contemplated that ceiling outlets be used in practicing the invention where they are more practical.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In a system for maintaining predetermined temperature and humidity conditions in a plurality of zones each of which may be subjected to varying sensible heat and vapor condensing loads, the combination of, an air cooling system which includes a compressor and cooling means forming a cooling zone, air moving means to cause a stream of air to flow through said cooling zone, air distribution means to carry the cooled air to the various zones and to discharge air at controlled rates into the various zones, humidity responsive control means to control the temperature of the air passing from said cooling zone whereby a rise in humidity tends to cause a reduction in the temperature of the air discharged into said zones, and control means responsive to the temperature of the air in each of said zones to control the quantity of air delivered to that zone, said humidity-responsive control means including a central controller which controls the operation of said compressor and individually responsive humidistat means in each of said zones adapted to influence the operation of said central controller to reduce the temperature in said cooling zone whenever the humidity in any of said plurality of zones rises above an acceptable value.

2. In a system for maintaining predetermined temperature and humidity conditions in a plurality of zones each of which may be subjected to varying sensible heat and vapor condensing loads, the combination of, an air cooling system which includes cooling means forming a cooling zone, air moving means to cause a stream of air to flow through said cooling zone, air distribution means to carry the cooled air to the various zones and to discharge the air at controlled rates into the various zones, humidity-responsive control means responsive to the humidity in each of said zones to control the temperature of the air passing through said cooling zone whereby a rise in humidity in any zone tends to cause a reduction in the temperature of the air discharged into said zones, and control means responsive to the temperature of the air in each of said zones to control the quantity of air delivered to that zone.

3. Apparatus as described in claim 2 wherein said air cooling means is the evaporator of a refrigeration system.

4. Apparatus as described in claim 3 wherein said refrigeration system includes a compressor and a condenser and wherein the temperature of the evaporator is reduced.

5. Apparatus as described in claim 4 which includes means to re-circulate air and to draw in a controlled quantity of fresh air.

6. Apparatus as described in claim 5 which includes, a header duct and a plurality of distribution ducts connected to receive air therefrom and to direct the air to the various zones.

7. Apparatus as described in claim 6 wherein the air is discharged at a controlled velocity through each of said distribution ducts by reducing each outlet opening to reduce the volume of air flowing through that opening in direct proportion to the reduction in its area.

8. Apparatus as described in claim 4 wherein said humidity-responsive control means includes a central controller which controls the operation of the compressor and individually responsive humidistat means in each of said zones adapted to influence the operation of said controller to reduce the temperature in said cooling zone whenever the humidity in any of said plurality of zones rises above an acceptable value.

9. Apparatus as described in claim 4 wherein operation of the compressor is controlled by a thermostat responsive to the temperature of the air leaving the cooling means, and said humidity-responsive control means being connected to reset said thermostat to reduce the temperature at which said compressor is stopped when the humidity is high.

10. An air conditioning apparatus for controlling the temperature and humidity in an enclosure comprising a cooling means which varies in temperature, said cooling means constituting the evaporator of a refrigeration system having a condenser and compressor means for flowing a stream of air to an enclosure in heat exchange relationship with said cooling means, a flow control unit for varying the quantity of said air flowing to said enclosure, a thermostat in said enclosure for regulating said flow control unit to vary the amount of cooled air delivered to said enclosure in accordance with the temperature therein, and means for regulating the temperature of said cooling means to progressively increase the degree of dehumidification of said stream of air delivered to said enclosure as the volume of air flow decreases comprising a thermostat responsive to the temperature of the air leaving the cooling element for starting and stopping the compressor, and the thermostat in the enclosure being connected to re-set the thermostat for controlling the compressor to stop the compressor at a lower temperature of the air leaving the cooling element when the temperature in the enclosure falls.

11. An air conditioning apparatus for controlling the temperature and humidity in a room, the combination of an air cooling system having a cooling means, means for flowing a stream of air to said room in heat exchange relationship with said cooling means, a flow control unit for varying the quantity of air in the stream flowing to said room, a thermostat in said room for regulating said flow control unit to vary the amount of cooled air delivered to said room in accordance with the temperature therein, a control for said cooling system responsive to a temperature condition affected by said cooling means and operable at a predetermined temperature to decrease the rate of cooling by said cooling means, and means responsive to a condition affected by a decreased volume of air delivered to said room for adjusting the control means to decrease the predetermined temperature at which said control operates to progressively increase the rate of dehumidification of the stream of air delivered to the enclosure as its volume decreases.

References Cited in the file of this patent

UNITED STATES PATENTS

| | | |
|---|---|---|
| 2,092,842 | Hadjisky | Sept. 14, 1937 |
| 2,177,597 | Haines | Oct. 24, 1939 |
| 2,187,905 | Killingsworth | Jan. 23, 1940 |
| 2,192,348 | James | Mar. 5, 1940 |
| 2,208,443 | Ashley | July 16, 1940 |
| 2,214,057 | Hull | Sept. 10, 1940 |
| 2,259,780 | Seid | Oct. 21, 1941 |
| 2,273,992 | Robb | Feb. 24, 1942 |
| 2,296,822 | Wolfert | Sept. 22, 1942 |